United States Patent

Hall

[15] 3,658,620
[45] Apr. 25, 1972

[54] IRRADIATION LAMINATION PROCESS FOR AIR-INHIBITED POLYMERS

[72] Inventor: Roger P. Hall, Mayfield Heights, Ohio
[73] Assignee: SCM Corporation, Cleveland, Ohio
[22] Filed: June 17, 1968
[21] Appl. No.: 737,576

Related U.S. Application Data

[63] Continuation-in-part of Ser. No. 682,140, Nov. 13, 1967.

[52] U.S. Cl..............................156/272, 117/62, 117/93.31, 156/231, 156/242, 156/246, 156/310, 156/322, 161/233, 204/159.19, 264/22
[51] Int. Cl. ........................................B32b 27/16, C09j 5/02
[58] Field of Search..................156/272, 310, 322, 242, 246; 117/62, 93.31; 161/231–233; 204/159.14–159.15, 159.19, 159.22–159.23; 264/22

[56] References Cited

UNITED STATES PATENTS

| | | | |
|---|---|---|---|
| 2,956,904 | 10/1960 | Hendricks | 117/93.31 |
| 3,291,672 | 12/1966 | Sonneborn et al. | 156/272 X |
| 3,326,710 | 6/1967 | Brodie | 204/159.19 X |
| 3,511,687 | 5/1970 | Keyl et al. | 117/62 |

Primary Examiner—John T. Goolkasian
Assistant Examiner—M. E. McCamish
Attorney—Merton H. Douthitt, Wesley B. Taylor, Harold H. Baum and Howard G. Bruss

[57] ABSTRACT

A process for preparing a laminable sheet from a substantially catalyst-free system containing a polymerizable organic unsaturated resin susceptible to free-radical one comprising assembling a film or the like of the resin in contacting substantially coplanar relation with a membrane, and then exposing the resulting assembly while overlying a substrate to high energy radiation. This action cures a depthwise segment of the assembly contiguous to the substrate and provides a non-tacky, mar-resistant undersurface to the film while leaving at least the upper exposed surface of the assembly in a relatively tacky, mar-susceptible condition. The latter surface thereby defines an interface of a resulting laminable sheet adapted for subsequent adherence to another lamina.

Preferably, the process includes the ultimate step of lamination as well. In this embodiment, the described assembly is first passed through onm treating zone effective to impart mass integrity and thereby define a sheet, and is then passed in juxtaposition with a cooperating lamina through another treating zone effective substantially to complete the cure of the resin and simultaneously laminate the sheet to the cooperating lamina, one of the treating zones comprising exposure to high energy radiation.

13 Claims, 1 Drawing Figure

Patented April 25, 1972
3,658,620
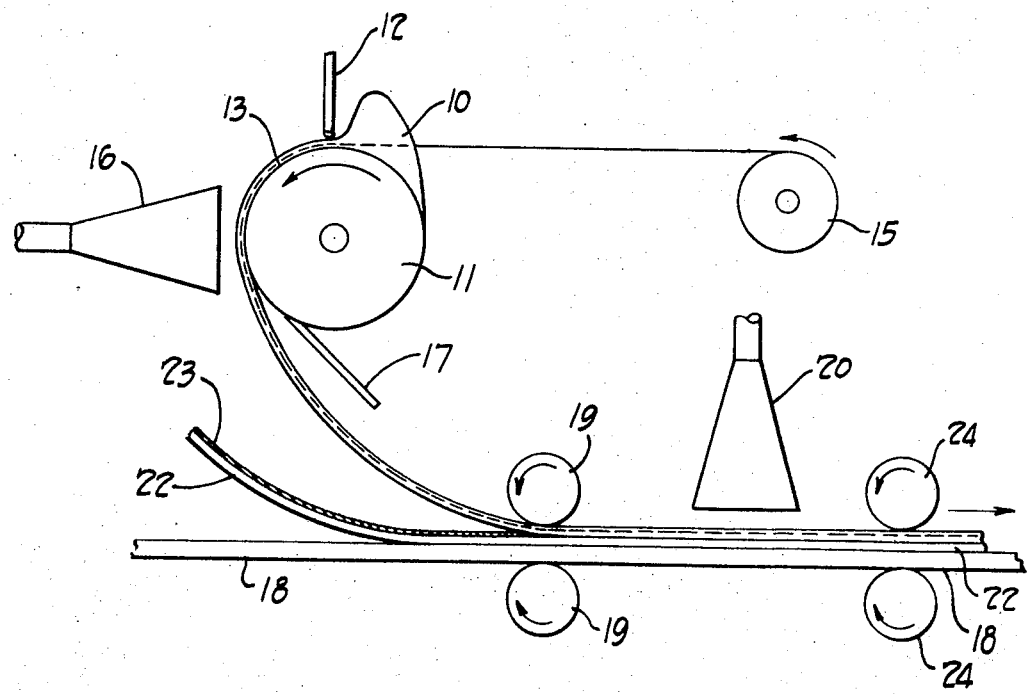
INVENTOR.
ROGER P. HALL
BY
ATTORNEY.

IRRADIATION LAMINATION PROCESS FOR AIR-INHIBITED POLYMERS

CROSS REFERENCE TO RELATED APPLICATION

This is a continuation-in-part application of an application by Roger P. Hall, entitled "Curing Air-Inhibited Resins by Radiation", filed Nov. 13, 1967, and assigned Ser. No. 682,140.

BACKGROUND OF THE INVENTION

It is known to laminate layers in overlying relation by the combined action of heat and pressure to form a stratified article or laminate. In one aspect of this art, resin-impregnated sheets known variously as "overlays" or "pre-pregs" are so bonded to substrates.

A continuous, uninterrupted process is not always possible in such lamination, since the impregnation and lamination are often performed by different processors in different locations. One practice is to prepare a cured or partially cured resin-impregnated sheet which can be easily handled and stored until such time that it is desired thermally to laminate it to a suitable substrate to form a laminated article. The resinuous systems employed to effect such lamination have required certain levels of catalysts for polymerizing or curing the resin, thereby adding to the cost in materials and labor to prepare the finished products. It would advance the art if the need for such catalyst was eliminated or substantially reduced.

Moreover, many thermosetting resins, such as those typified by thermosetting, unsaturated polyester resins, exhibit air-inhibited curing at their air-contacting surfaces. Such surfaces are softer than the interiors of the resins and are therefore more easily scratched and marred. Obviously, these qualities are undesirable, especially when such a resin is to be used for coating purposes. Several techniques have been suggested to overcome air-inhibition in the curing of resins. For example, U.S. Pat. No. 3,210,441 to Dowling et al is based on the discovery that the presence of esterified residues of monohydroxy acetals in polyester resins of particular formulation are free of air-inhibition.

Within relatively recent years, the polymerization of resinuous materials by electron radiation has increasingly become of interest. However, the use of this technique has encountered the same difficulty with many thermosetting resins, namely, air-inhibition at the resin-air interface. During penetration by high energy radiation, the resinuous material undergoes an "ionization effect" which induces chemical reactions including polymerization; note U.S. Pat. 2,863,812 to Graham. Radiation, such as a beam of electrons, has not been found to have any appreciable ionization effect at the exposed surface of irradiated material. The desired ionization effect is obtained only after penetration of the resinuous material. Previous attempts have been directed to modifying the radiated energy so as to obtain an ionization effect after relatively short distances of penetration. For example, in U.S. Pat. 2,863,812 to Graham, electrons pass through an electrically conductive shield before impinging upon the material to be radiated. This technique, of course, increases and complicates the type of apparatus used for the radiation.

It would accordingly, also advance the art if the use of high energy radiation could be adapted easily to cure completely such air-retarding polymerization, especially without requiring any chemical modification of the resinuous material itself or additional and complicating radiation apparatus.

SUMMARY OF THE INVENTION

In accordance with the present invention, a laminable sheet is prepared by the use of high energy radiation from a substantially catalyst-free system of a polymerizable organic unsaturated resin of the air-inhibited type, for example, a resin susceptible to free-radical catalysis.

In general, a film of the resinuous system is assembled with a membrane in contacting, substantially coplanar relation, and then the assembly is exposed to high energy radiation while the assembly overlies a substrate. The side of the assembly shielded from the atmosphere is cured to a tack-free, mar-resistant condition, while the side of the assembly open to the atmosphere remains relatively tacky and mar-susceptible. This may be due to the chemical combination of oxygen or other elements (from the air) which render the open surface incapable of cure to a mar-resistant state. The resulting laminable sheet can then be laminated in a separate operation to a suitable substrate or cooperating lamina, using the relatively tacky side of the assembly to face and contact the substrate.

When the process includes lamination as well, for example on a continuous basis, the described assembly of resin film and membrane is passed successively through at least two treating zones. The objective of the first zone treatment is to impart a tack-free, mar-resistant surface to a shielded side of the assembly, as before, and also to impart mass integrity to the assembly, so that it may thereafter be treated as a self-supporting sheet, although portions of the resin of the assembly may still be capable of further cure. In this regard, the membrane serves as a reinforcing member in addition to the other uses hereinafter described. The objective of the second zone treatment is to complete all possible cure of the resin and, preferably simultaneously, laminate the assembly to another lamina.

In either embodiment of the process, there must be exposure to high energy radiation at least at one juncture, for instance, at one of the treating zones. This avoids the need for a polymerization catalyst or greatly reduces the need to a relatively small or almost insignificant amount. If high energy radiation is not employed at a treating zone, any heat generating source, such as an infra-red lamp, heated drum, gas oven, or the like may be employed at a treating zone not utilizing such radiation. Use of any of these alternate means as an initial treatment does impart a non-tacky, mar-resistant surface at the shielded side of the resin-membrane assembly while leaving the opposite side relatively tacky and mar-susceptible. It is preferred, however, to use high energy radiation in lieu of such alternate means.

The cooperating lamina which is joined to the present laminable sheet, as at the second zone treatment (whether by heat or radiation) can be wood, metal, plastics, paperboard, or the like. In this modification, an adhesive, which can be chemically reactive, may be used between the sheet and lamina to facilitate their lamination.

BRIEF DESCRIPTION OF THE DRAWING

The accompanying FIGURE schematically illustrates the present process for forming a laminable sheet by radiation when adapted for continuous operation; and wherein the laminable sheet is simultaneously laminated to a substrate during the second zone treatment.

DESCRIPTION OF THE PREFERRED EMBODIMENTS

As used here and in the claims, the term "high energy radiation" is taken to include particle emission or electromagnetic radiation. The particles can be electrons, protons, neutrons, $\alpha$-particles, etc. The electromagnetic radiation can be radio waves, microwaves, infra-red waves, ultra violet waves, X-rays, gamma rays, and the like. The radiated energy may be applied to the resinuous material in one or more doses for each of the described exposures. As a general guide, only that amount of energy need be applied in any case that completely penetrates and cures the resin, as herein contemplated, and within a time period at least comparable to that for a conventional heat-activated reaction for the same material. Excess energy is not only wasteful, but may result in undesired heating of the resinuous material and attendant apparatus with possible charring and other decomposition. The amount of energy required depends on several factors, such as the nature and thickness of the resinous film; extent of prior cure, if any; distance between the energy source and resin; and the like. The requisite amount of energy for any given situation may be readily determined by trial and error.

With respect to electron bombardment, suitable sources of radiation include radioactive elements, such as radium, cobalt 60, and strontium 90, Van de Graaff generators, electron accelerators, and the like. The accelerators or guns, where used, may be of the type supplying from about 100 to about 300 KEV (1000 electron volts) at about 10 to 1,000 milliamperes or even higher. As reported in British Pat. No. 949,191, in most commercial applications of irradiation techniques, electrons have been used having an energy of between 500 to 4,000 KEV. Such electrons have a useful penetration of about 0.1 to about 0.7 inch in organic material having a specific gravity of around one. As another measure of radiation, U.S. Pat. No. 3,247,012 to Burlant discloses that the potential of an electronic beam for radiation purposes may be in the range of about 150,000 to about 450,000 volts.

By microwaves and microwave energy is meant electromagnetic wave energy. Microwaves can be generated by radio frequency power tubes such as the magnetron, amplitron and klystron. Their frequencies range between about 300 MHz and 300,000 MHz, "MHz" designating one megahertz and being equal to $10^6$ cycles per second. U.S. Pat. No. 3,216,849 to Jacobs describes and illustrates one type of microwave generator which may be used. Normally, a 10 to 50 second exposure to microwaves suffices for curing a film of resinuous material, depending on the intensity of the microwaves and thickness of the film. A polymerization catalyst may be required in the resin mix when microwaves are used, for example from about one fourth to one half of the normal amount, but electron beams usually entirely eliminate the need for catalyst.

In the case of microwave radiation, it is preferred to use a non-metallic substrate because commercial machines are not suitable for metallic substrates. Also, polar resinuous materials like polyester-reactive resins much more readily absorb microwave energy than non-polar materials. However, unlike electron beams, microwaves can reach sharply indented parts and require much less shielding. If desired, a combination of high energy radiation with a low level of a polymerization catalyst in the resin mix may be used.

The resin systems contemplated by the present invention are those exhibiting inhibition to cure in the presence of air, oxygen and/or nitrogen being generally considered to be responsible for inhibiting or even preventing a desired cure to a non-tacky state. Thus the term "air-inhibited resin" is taken to mean a resin which does not cure as well, with respect to forming a tack-free, mar-resistant finish, in the presence of air as the resin does when protected from air. Many resins suffer in some degree, more or less, from this shortcoming. Usually such resins contain appreciable amounts of unsaturated, carbon-to-carbon linkage, such as unsaturated, organic polymerizable materials or reaction products like copolymers of isobutylene and conjugated diolefins such as isoprene, butadiene styrene, butadiene acrylonitrile, and the like. As a rule, this class of resins includes those which polymerize under conditions known in the art as free-radical catalysis. For example, partially cured polybutadiene, polyisoprene, and resins containing pendant acrylic, methacrylic, maleic, and fumaric groups may exhibit air-inhibition. A specific example of an air-inhibited resin is the condensation-product of three moles of hydroxypropyl methacrylate and one mole of hexamethoxymethylmelamine. The resulting product can be cured in accordance with the present invention either as so condensed or as further reacted with an olefinic compound such as a vinyl monomer like styrene. The olefinic compound may serve as a solvent for the resin, or if desired, a non-reactive, fugitive solvent may be used.

However, the invention finds chief application in the curing of unsaturated polyester resins, especially when blended with one or more reactive olefinic, unsaturated compounds, such as vinyl monomers, which serve as cross-linkers. It is the cross-linking which is difficult to realize to a maximum obtainable degree by ordinary techniques in an oxygen atmosphere.

Such polyesters are well known in the art and may, for example, be derived from reaction between alcohols including ethylene, propylene, butylene, diethylene, dipropylene, trimethylene, and triethylene glycols, and polyols like glycerine; and unsaturated poly-basic acids including maleic acid, maleic anhydride, fumaric acid, chloromaleic acid, itaconic acid, citraconic acid, mesaconic acid, and the like.

Typical cross-linking monomers include styrene, vinyl toluene, methyl methacrylate, alpha-methyl styrene, divinyl benzene, dichlorostyrene, lower dialkyl maleates, and lower dialkyl fumarates. Still other useful cross-linkers include: ethylene glycol diacrylate, ethylene glycol dimethacrylate, diethylene glycol diacrylate, diethylene glycol dimethacrylate, triethylene glycol diacrylate, triethylene glycol dimethyacrylate, tetra-ethylene glycol diacrylate, tetraethylene diamethyacrylate, trimethyol propane triacrylate, trimethylol propane trimethacrylate, hydroxyethyl acrylate, hydroxyethyl methacrylate, hydroxy propyl acrylate, and hydroxy propyl methacrylate.

A minor portion, that is, up to about 40 mol percent, of the unsaturated acid can be replaced with saturated and/or aromatic polycarboxylic acids or their chlorinated counterparts. Typical acids which can be used for the indicated replacement are phthalic, isophthalic, adipic, pimelic, glutaric, succinic, suberic, sebacic, azelaic, chlorinated phthalic, tetrahydrophthalic, hexahydrophthalic anhydride, and the like.

In general, the nature of the substrate is not critical. Wood, plastics, metal, glass, paperboard, and the like may be used. In some instances, the type of radiated energy employed may influence the choice of the substrate as hereinafter noted.

The membrane may be non-porous such as in the form of sheets of cellophane, polymethacrylate, or the like. However, it is preferred for the membrane to be porous to provide a more intimate union with the impregnating resin. The porous membrane may be webbed, fibrous, etc. Specific examples include paper, wood such as plywood, cloth, fabric, mats of mineral fibers such as asbestos or glass fibers, and the like. The thickness of the membrane depends upon the end use of the laminable sheet. Normally, however, the thickness may range from about two to about 20 mils.

Paper is a preferred porous membrane, especially where "pre-pregs" or "overlays" are to be prepared in accordance with the present invention. It is also contemplated that the membrane may have a pleasing, attractive surface configuration which is visual after lamination of the resin-membrane sheet to a desired substrate in order to form a decorative or functional composite particle. For example, the membrane may have a wood-grain effect or any attractive pattern embossed or otherwise.

In practice, a resinous mix substantially catalyst-free and adapted for radiation cure is shaped by standard means into the form of a film, layer or coat. The membrane is associated with the resinuous film at this time in contacting, substantially coplanar relation. This can be accomplished by merely having the membrane overlie and contact the film, but it is preferred for the membrane to become embedded within the resin, particularly if the laminable sheet is to be used as an "overlay" in producing a laminated article. Since the cure of the resin is to be in situ, the resin mix may be a solvent-free, polymerizable admixture of the reactive ingredients. Such a mix may have previously undergone some polymerization but to a degree insufficient to alter the substantially fluid character of the mix. Of course, the mix may, if desired, contain a non-reactive solvent which in time evaporates.

Where it is desired to prepare a laminable sheet designed for lamination to a substrate at some delayed subsequent time, the film and membrane assembly is subjected to high energy radiation while the assembly overlies a substrate in the manner previously described. The resulting laminable sheet may then be stored until lamination to another lamina is in order.

Where it is desired to prepare the laminable sheet and then laminate it as well without delay, the film and membrane assembly is passed through at least two treating zones while overlying a substrate in each zone. The first treating zone is designed to advance the cure of the resin at least to a point sufficient to impart mass integrity to the assembly and thereby define a sheet and to provide a tack-free, mar-resistant undersurface as described. This can be accomplished either by exposing the assembly preferably to high energy radiation; or by exposing it to heat sufficient to obtain the result desired, as long as radiation is then employed in the second treating zone. This treatment as adapted for the present process uniquely takes advantage of the air-inhibition. The resinous shielded face of the assembly, contiguous to the substrate, cures to a tack and mar-free condition, while the upper surface of the assembly, exposed to the atmosphere, remains relatively soft, tacky, and mar-susceptible. In general, an appreciable part of any volatile solvent, which may be present in the resin mix, is also driven off in the first zone treatment.

In the second treating zone, the sheet again overlies a substrate and the entire combination is subjected either to high energy radiation (if not used previously) or to heat to effect a lamination of the soft tacky side of the sheet, now shielded from the atmosphere, which it now overlies. Of course, radiation can be used at both zones of treatment if desired. The second zone treatment may not necessarily make the undersurface (the top surface in the first zone treatment) completely tack-free even at this juncture, but it does complete any cure possible and also serves the highly useful function of simultaneously laminating the film to a substrate.

In this case, the substrate defines a cooperating lamina. When the lamina is relatively porous, as in the case of plywood, no adhesive aid may be necessary. The uncured, tacky "skin" of the resin of the assembly may sufficiently penetrate the wood to form a mechanical or chemical bond therewith as in chemically combining with hydroxyl groups present in cellulose. However, it is within the contemplation of the invention to apply an adhesive to the uncured or tacky side or face of the resin film, or to the substrate itself, prior to the exposure of the second zone treatment. This is particularly true when the substrate is smooth and non-porous as in the case of glass. A wide gamut of adhesives known in the art may be used. The only requirement is that the final treatment, for example exposure to radiation, does not destroy the adhesive qualities.

A preferred manner of laminating the resinous film to a substrate is to use an adhesive which is curable by radiation and/or chemically reactive with the uncured side of the film and/or the substrate. The choice of a chemically reactive adhesive is determined largely by the chemical nature of the resin itself. The chemically reactive adhesive may be an additional layer of any of the polyester resins and/or cross-linking agents previously disclosed, for instance, styrene, or a mixture of a polyester resin mix and a crosslinker. In any case, the chemically reactive adhesive may also be in an unreacted or partially reacted stage.

One chief advantage of using such materials to define a chemically reactive adhesive is that the materials are also subject to cure by radiation, so that the entire assembly is simultaneously finally cured and bonded (either chemically or mechanically) to a substrate to form a laminate by the same radiation exposure. As a further modification, the adhesive may if desired contain a catalyst effective to catalyze a reaction between the adhesive and the resin film.

At any time prior to the final laminating step, the film may be stretched to reduce its gauge or thickness. This technique is especially useful when quite thin films are desired, and it is not feasible to work with such thin films prior to a final cure. For example, films may be stretched to reduce their thickness from about 10 mils to about 2 mils. The film may, however, be stretched to a point short of forming pinholes, tears, and the like.

If the membrane itself is stretchable, as in the case of a loose mat of unbonded mineral fibers, the assembly can be stretched manually or by clamps mounted to grip the edges of the film and to move relatively away from one another. If the membrane is not stretchable, as in the case of a sheet of cellophane, the assembly may be passed between the rollers to spread out the resin and thereby reduce the thickness of the assembly.

The following examples are intended merely to illustrate the invention and should not be construed as limiting the claims.

EXAMPLE 1

A thermosetting polyester resin was prepared by reacting equal molar portions of 1,3-propylene glycol and maleic anhydride. Water was removed until the resin had an acid number of 35. An amount of 70 parts of the cooled reaction product was then mixed with 30 parts of styrene monomer, all by weight.

Referring to the FIGURE, a supply 10 of the resulting polyester resin mix was periodically dumped onto a slowly rotating drum 11 having a chrome plated surface to minimize adherence with the mix. A doctor knife 12 smoothed the mix to a film form 13 which is enlarged in the figure for purposes of illustration. A paper membrane of about 65 pounds grade, advanced from a roll 15 to be caught in the resin 10, such that the membrane passed beneath the doctor knife 12, in the embodiment illustrated, substantially equidistant between the faces of the film 13. The membrane 14 might, if desired, be mechanically advanced as by power-driven rollers. Normally, however, once the continuous process starts, the advance of the film 13 with the membrane 14 embedded therein is sufficient as illustrated to pull the trailing portion of the membrane from its roll 15 at a proper speed.

An electron accelerator 16 of standard construction bombarded the film 13 with a radiation of 20 megarades as it passed at a rate of about 20 feet per minute. In general, the radiation strength of the gun 16 and the speed of rotation of the drum 11 are synchronized to cure at least enough of the film that it has sufficient mass integrity to be stripped from the drum 11 as by a knife edge 17 without rupturing; and also to provide a tack-free, hard undersurface to the film 13 as previously described. If high energy radiation had not been used for this step, the drum 11 could have been internally heated as by steam; or the gun 16 could have been replaced by an infra-red lamp, an oil or gasfired burner, or the like.

A continuous conveyor 18 caught the film and membrane assembly 13 atop a plywood substrate 22 as the two laminae together passed between compressing rollers 19 and 24. The plywood substrate 22 has an adhesive coating 23 of a polymerizable, unsaturated polyester resin. This resin was prepared by partially reacting equal molar amounts of diethylene glycol and maleic anhydride with removal of water until an acid number of 35 resulted. An amount of 70 parts of the resulting condensation product was dissolved in 30 parts of a styrene monomer all by weight.

The film 13 and plywood 22 together passed beneath a second accelerator gun 20 while riding the conveyor. This accelerator gun would have been necessary if no high energy radiation had been used adjacent the drum 11 as described. Otherwise the use of the accelerator 20 is optional, and it could be replaced by more conventional heat sources. Of course, electron accelerators could be used at both stations.

In any event, it is emphasized that the top side of the film 13 at the second treating zone was the underside of the film when it overlay the drum 11. Subsequent exposure to radiation from the electron accelerator 20 not only completed any possible further cure of the film but also cured the adhesive coating 23 on the plywood 22 as well and chemically bonded the film 13 to the plywood to form a laminate. This laminate was subsequently lifted from the conveyor 18 and conventionally cut to size.

EXAMPLE 2

An unsaturated polyester resin was prepared by reacting 696 grams of ethylene glycol and 2,128 grams of propylene glycol with 3,098 grams of isophthalic acid and 2249 grams of maleic anhydride until esterification was substantially complete, as indicated by an acid number of about 15 to 20. The resulting polyester was then diluted with 2,249 grams of toluene.

A procedure was carried out with this resin mix like the procedure of example 1, except that after the initial radiation exposure on drum 11, the laminable sheet was cut to size and the resulting sheets stored for a period of time, while remaining readily laminable to a suitable substrate with or without the use of intervening adhesives. The impregnated laminable sheet of this example at this juncture contained from about 60 per cent to about 70 per cent by weight resin when intended for forming decorative "overlays." Sheets having 70 per cent or more resin by weight are used in making very hard, high glossy, clear laminates.

The stored resin-impregnated sheets were laminable, as a batch operation in a match die or flat press, over a wide range of pressures (100 to 600 psig), temperatures (about 240° to 300° F.), and time cycles (about 2 to 10 minutes) with lower temperatures requiring longer time cycles. Since the impregnation resin was thermosetting, the laminates can be stacked hot out of the press. A typical cycle for laminating a resin impregnated sheet was 6 minutes at 200 psig and 260° F., although laminates could have been produced in cycles of 4 minutes at 275° F. and 200 psig to 7 minutes at 260° F. and 170 psig. Such laminated articles are attractive in appearance and have durable stain and impact resistance, excellent color retention, and chemical resistance.

All patents cited are hereby incorporated by reference. While the foregoing describes preferred embodiments and various modifications of the invention, it is understood that the invention may be practiced still in other forms within the scope of the following claims.

What is claimed is:

1. A process for preparing a laminable sheet from a substantially catalyst-free system containing a polymerizable organic unsaturated resin susceptible to free-radical catalysis, comprising: assembling a film or the like of said resin in contacting, substantially coplanar relation with a membrane, and exposing the resulting assembly while overlying and contacting a substrate to high energy radiation to cure a depthwise segment of the assembly contiguous to said substrate and thereby provide a non-tacky, marresistant under surface to said film while leaving at least the upper exposed surface in a relatively tacky, mar-susceptible condition, said upper exposed surface thereby defining an interface of a resulting laminable sheet adapted for subsequent adherence to a cooperating lamina.

2. The process of claim 1 wherein said polymerizable resin is an unsaturated polyester resin contained in a solvent including an olefinic compound reactive with said polyester resin.

3. The process of claim 2 wherein said olefinic compound is a vinyl monomer.

4. The process of claim 1 wherein said membrane is embedded within said film of resin.

5. The process of claim 1 wherein said membrane is porous.

6. A process of claim 1 wherein said membrane is non-porous.

7. The process of claim 1 wherein said high energy radiation is electromagnetic radiation.

8. The process of claim 1 wherein said high energy radiation is by particle emission.

9. A lamination process for a substantially catalyst-free system containing a polymerizable organic unsaturated resin susceptible to free-radical catalysis, comprising: assembling a film or the like of said resin in contacting, substantially coplanar relation with a membrane, passing the assembly through one treating zone effective to cure a depthwise segment of the assembly along said shielded face and thereby provide a non-tacky, mar-resistant surface to the film at said face while leaving at least the opposite face of the assembly in a relatively tacky, mar-susceptible condition, superimposing said assembly with respect to a cooperating lamina with said opposite face of the assembly overlying and contacting said lamina, and then passing the assembly and cooperating lamina through another treating zone effective substantially to complete the cure of said resin and laminate the assembly to said lamina, at least one of said treating zones comprising exposure to high energy radiation.

10. The process of claim 9 wherein said one treating zone comprises exposing the assembly to high energy radiation while one side of said assembly is shielded from the ambient atmosphere thereby to provide a non-tacky, mar-resistant finish at said side, and wherein said side is then exposed to the atmosphere during passage of the defined sheet and cooperating lamina through said another treating zone.

11. The process of claim 1 wherein said sheet and cooperating lamina have adhesive therebetween effective to facilitate the bond between the sheet and lamina.

12. The process of claim 11 wherein said adhesive chemically reacts at least with the resin of said sheet to bond it and the lamina together.

13. A process for forming a decorative laminate comprising assembling a film of a normally air-inhibited thermosetting resinous reaction product in contacting, substantially coplanar relation with a decorative membrane, exposing the resulting assembly while overlying and contacting a substrate to high energy radiation to cure a depthwise segment of the assembly contiguous to said substrate and thereby provide a non-tacky, mar-resistant undersurface to said film while leaving at least the upper exposed surface in a relatively tacky, mar-susceptible condition, then inverting the assembly on a lamina and again exposing the assembly to radiation to laminate together said assembly and lamina, said upper exposed surface forming an inface of the resulting laminate.

* * * * *